May 2, 1933.  K. E. WENZEL  1,906,349
TRACK BRAKE
Filed Sept. 19, 1927
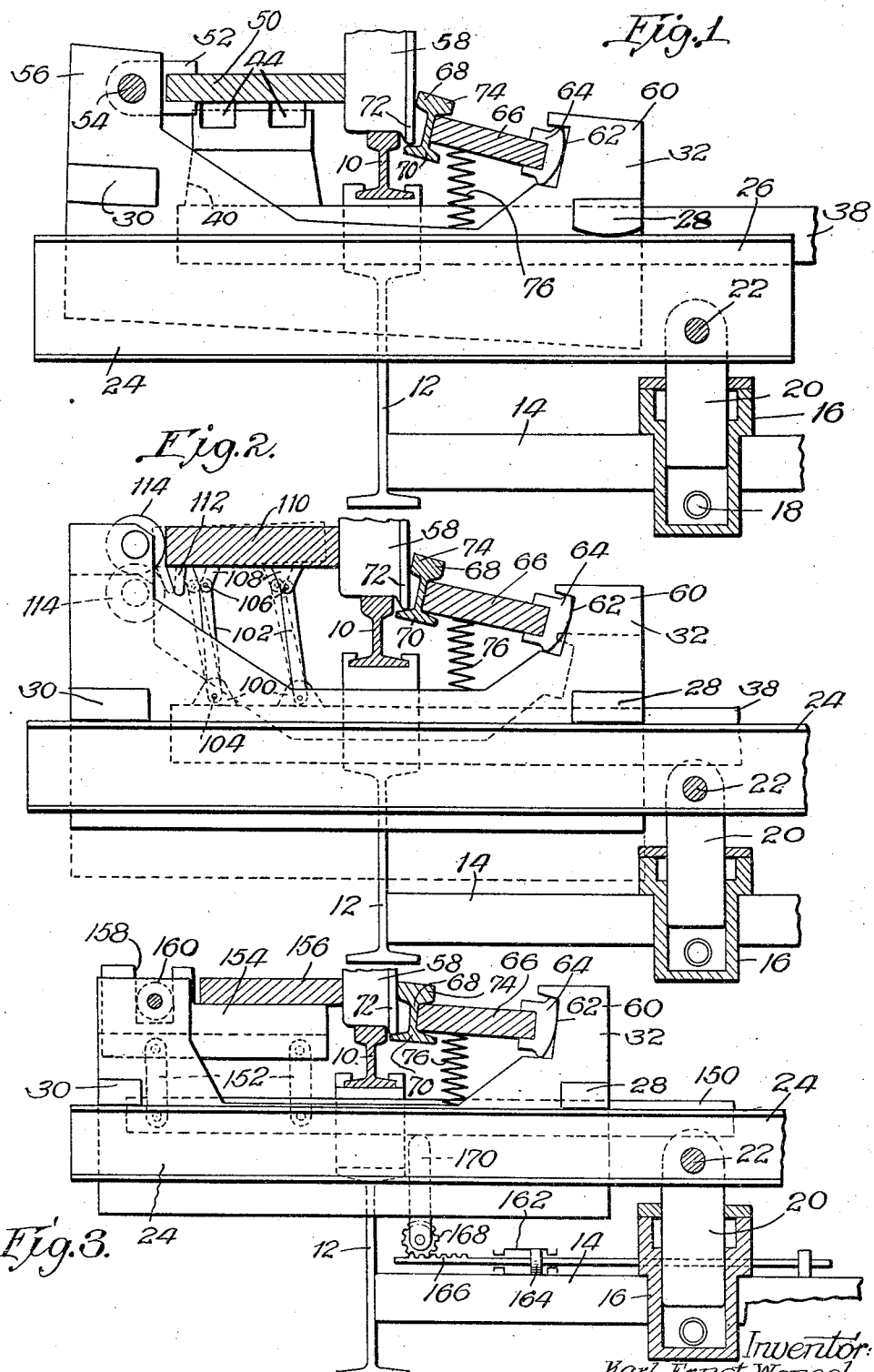

Patented May 2, 1933

1,906,349

UNITED STATES PATENT OFFICE

KARL ERNST WENZEL, OF HAMBORN, GERMANY, ASSIGNOR TO HANNAUER CAR RETARDER COMPANY, OF CHICAGO, ILLINOIS

TRACK BRAKE

Application filed September 19, 1927, Serial No. 220,593, and in Germany September 28, 1926.

This invention pertains to track brakes.

In some track brake systems, brake shoes are disposed only on one side of one rail and this construction has been quite satisfactory where light cars are in use, but in yards handling the maximum weights, unduly long single track shoe systems must be used. In order to cut down the length of the brake system, track rails are used wherein brake shoes are disposed on each side of the track rails. These systems cannot be too complicated on account of expense of installation and upkeep. It is therefore desirable to use as simple operating mechanism as possible and possibly utilize the weight of the car for applying at least one set of brake shoes. While the wheels of track vehicles are substantially of uniform width, still there is some variation in this width and so a system must be provided which will work equally well on wheels having any width tires.

It is therefore an object of this invention to provide a track brake wherein the braking action is independent of the width of and the wear of the tires of the wheels.

Another object of the invention is to provide a track brake system, the effectiveness of the operation thereof being increased by the action of the track vehicles.

Still another object of the invention is to provide a track brake system which can easily be rendered inoperative and one wherein operation of one set of brake shoes affects operation of another set of brake shoes.

A further object of the invention is to provide a track brake system wherein the brake shoes are effective at points substantially uniform on the wheels and which are points of maximum efficiency.

With these and various other objects in view, the invention may consist of certain novel features of construction and operation, as will be more fully described and particularly pointed out in the specification, drawing and claims appended hereto.

In the drawing, which illustrates an embodiment of the device and wherein like reference characters are used to designate like parts—

Figure 1 is a more or less diagrammatic sectional elevation of one track rail, showing the brake system associated therewith;

Figure 2 is a more or less diagrammatic sectional elevation of one track rail, showing a modified form of track brake system associated therewith; and Figure 3 is a more or less diagrammatic sectional elevation of one track rail, showing still another modified form of track brake system associated therewith.

In general, it might be well to state that in the description of these track brake systems, it will be understood that the track rails are fixed and the track brake is disposed in position with respect to the track rails intermediate the ties so that the systems may be said to be merely set in the roadbed in cooperative relation with the rails. These systems are particularly useful in connection with yards where humps are used, and these brake systems are used for braking cars which are released from the top of the hump and run into different sections of the yards. In this case it will be understood of course that the track brakes are operated from points which may be remote from the brakes by any means, such as electricity or fluid pressure. In the present case, the actuating means is shown as a fluid pressure system and will be described as such, though it will be understood that any means may be used for imparting motion to certain of the movable parts.

Referring first of all more particularly to Figure 1, the track rail 10 is fixed and may be anchored by some framework 12 extending downwardly below the track bed (not shown) and forming a support for transverse brackets 14 secured to the fluid actuating cylinder 16. The cylinder 16 is operated at some remote point by the usual operating throttle means, fluid pressure lines communicating with the cylinder at some points 18. The cylinder is provided with a piston 20 having sliding engagement therewith and being fluid operated, said piston having pivoted engagement as at 22 with a movable supporting beam or frame 24, said beam having vertical movement with respect to the track rails 10 and being actuated by means of the piston 20.

In systems of this sort, it is not unusual for the supporting beam 24 to extend completely across the track, and a pair of cylinders 16 may be provided so that there will be two points of support, the beam 24 being raised and lowered thereby though in some cases it may be possible to use only one cylinder 16 wherein two points of support are provided for the beam by means of a proper head provided on the piston 20. In this case, as well as in modifications shown in Figs. 2 and 3, it will be understood that parts are duplicated for the other track rail 10 so it is thought it will not be necessary to describe each system for each rail.

The beam 24 may be of any section, such as I-beam or H-section, the top flange 26 thereof forming a support for supports 28 and 30 provided on the shoe supporting yoke 32, support 28 preferably having a curved supporting face. Said yoke is substantially U-shape and extends under the track rail 10 and is movable with respect thereto both in vertical and horizontal directions. The supports 28 and 30 are provided on the yoke 32 and rest on the beam 24, movement of rotation of the yoke with respect to the track rail 10 being accomplished by said supports. Cross-beams or ties 38 are provided, fixed with respect to the rail 10 and preferably secured to the upper portion of the support or sill 12, said ties forming a support for the upwardly extending pedestal 40, said pedestal being provided with shoes or the supports 44 whereby said brake member 50 may be supported with respect to the rail 10. The brake member 50 is provided with a head 52 pivotally mounted as at 54 to the upwardly extending arm 56 of the yoke 32. The brake member 50 is therefore disposed to be moved to inoperative position by being pivotally moved about the pivot 54 to a position where it cannot be engaged by the wheel. This is accomplished by manually moving the member 50 about the point 54 or by downward movement of the yoke 32 causing the member 50 to be moved upwardly by virtue of engagement with the relatively fixed supports 44. However, it will be noted that when it is in operative position, it engages the wheel 58 of a track vehicle at a constant height from the rail and at points to give the maximum effort.

The upwardly extending arm 60 of the yoke 32 is provided with a recessed portion 62 facing the track rail 10, which recessed portion forms a support for the cam head 64 of the brake member 66, said member being provided with a brake shoe 68. This brake shoe is substantially rail-shaped, having the lower flange 70 adapted to be contacted by the rail flange 72 of the wheel 58 whereby the brake shoe is depressed downwardly, causing the head 74 to contact the wheel 58 for braking action. When the brake shoe is depressed downwardly, the supporting spring 76 is depressed until the wheels cease to contact the brake shoe, whereupon the spring 76 will return the brake shoe 68 upwardly to its supported position for receiving the next wheel.

In the operation of this structure, first of all assuming that the piston 20 is in lowered position, the brake shoes will be in lowered inoperative position and the brake members will be in raised inoperative position so that any vehicle passing along the track will be entirely free of the brake system and the wheels will not have contact with the brake members 68 and 50. When it is desired to have the system operate for braking the track vehicle, fluid is introduced to the cylinder 16, causing the piston 20 to move upwardly and of course the corresponding piston in the other cylinder, should another cylinder be used. Upward movement of the piston moves the supporting beam 24 and the yoke 32 upwardly, thereby disposing the brake members 68 and 50 in operative position. A vehicle wheel running along the track rail 10 contacts the brake member 50 and the flange 70 of the brake shoe 68, depressing the member 66 against the spring 76 and around the cam 64, causing the member 74 of the brake shoe to contact the side of the wheel. This causes a tightening effect between the brake member 50 and the brake shoe 68, stopping movement of the wheel. In some cases, especially where the tires of wheels 58 are somewhat wide, when the brake shoe 68 comes into operation a pivotal action is caused around the cam 28 due to depressing the support 24 which of course tends to move the yoke 32 in a clockwise direction whereby the support 30 is slightly raised from the supporting beam. When however the wheel leaves the brake system, the support 30 again has engagement with the supporting beam 24. In order to release the wheels after braking operation, it is only necessary to release the fluid in the cylinder 16, dropping the beam 24 and the yoke 32 with its brake system. In this case, the lowering of the system releases the pressure exerted between the member 50, the brake shoe 68 and the wheel, permitting the wheel to be moved along the rail 10.

Referring now more particularly to the modification illustrated in Figure 2, as before the track rail 10 is fixed to the sills or frame 12 disposed below the track bed (not shown) forming a support for the transverse brackets 14 associated with the operating cylinders 16. The piston is secured to the supporting beam 24 as at 22 for moving said beam. As before, the beam forms a support for the supports 28 and 30 provided on the shoe supporting yoke 32. The yoke is substantially U- shaped, extending under the track rail 10, and is movable with respect thereto both in vertical and horizontal directions. The supports 28 and 30 are provided on the yoke, permitting rotation of the yoke with respect to the support 24. Cross-beams or ties 38 are provided fixed with respect to the rail 10 and provided with pedestals 100 to which links 102 are pivoted at 104. Said links are pivoted at their top as at 106 to pedestals 108 provided on the brake member 110, said member being provided with a depending cam portion 112 adapted to be engaged by a roller 114 when moved from its dotted line to its full line position to urge the member 110 toward the rail 10 and consequently the vehicle wheel 58. As before, the upwardly extending arm 60 of the yoke 32 is provided with a recessed portion 62 facing the track rail 10, which recessed portion forms a support for the cam head 64 of brake member 66, said member being provided with the brake shoe 68. This brake shoe is substantially rail-shaped, provided with a lower flanged portion 70 adapted to be contacted by the wheel flange 72 and is provided with a head portion 74 for effecting a braking action against the face of the wheel 58. The supporting spring 76 is provided on the yoke and cooperates with the brake member 66 for maintaining the brake shoe in a raised position for contacting the wheel.

In the operation of this structure, assuming the piston 20 to be in lowered position, it will of course be understood that the braking system is inoperative and any vehicle wheels running along the rail 10 will not be retarded. When it is desired to raise the system into operative braking position, fluid is introduced into the cylinder 16, raising the piston 20, causing the frame member 24 to be raised. Raising the frame member 24 raises the yoke 32, causing the roller 114 to move from the dotted line position to full line position, thus causing it to operate along the cam 112, upward movement of the roller causing the brake member 110 to move toward the right, as viewed in Figure 2, to wheel contacting position, parallel movement being given to said member by the links 102 as they are pivoted as at 104 to the pedestals on the fixed tie 38. The wheel then contacting member 110 urges the yoke toward the left, thus moving the brake shoe 68 toward the wheel, and the wheel flange 72 depressing the flange 70 of the brake shoe causes the brake shoe to pivot around the cam member 62, thus applying the head 74 to the wheel in braking operation.

In the modification illustrated in Figure 3, track rail 10 is fixed, being anchored to the sills or frame 12 disposed below the track bed (not shown). Brackets 14 are secured to the sills 12 and the operating cylinder 16, said cylinder being provided with a piston 20 pivoted as at 22 to the movable supporting beam or frame 24, said beam being capable of vertical movement with respect to the track rails 10 and being actuated by means of the piston 20. The beam 24 forms a support for the yoke 32, said yoke being substantially U-shaped and extending under the track rail 10 and being movable with respect thereto both in vertical and horizontal directions. Yoke 32 is provided with supports 28 and 30 for movement with respect to the frame member 24, as has already been described. In this case, cross-beams 150 are provided which extend between the track rails 10 and are movable with respect to said track rails, said members 150 being guided by any suitable means (not shown) and provided with pivotally mounted links 152 which in turn pivotally support the frame 154 which supports the brake member 156 secured thereto. The frame member 154 is provided with a slot 158, the sides of which engage the roller 160 for the transmission of stresses from the wheel 58 to the yoke 32, it being seen that the brake member 156 has movement substantially in a vertical direction only. The upwardly extending arm 60 of the yoke 32 is provided with a recessed portion 62 in which is disposed the cam head 64 of the brake member 66. A brake shoe 68 is carried by said brake member and is provided with a lower flange 70 adapted for contact with the wheel flange 72 for causing braking action by the head 74. The brake member and shoe is supported from the yoke by means of the spring 76 which tends to maintain the brake shoe in a raised operative position. The cylinder 162 is provided with a piston 164 having a rack 166 which is adapted to engage and operate a pinion 168 for raising and lowering the arm 170 which causes vertical movement of the beam 150, it being understood that a pair of such members is provided operated from cylinder 162.

In operation then, assuming the system to be in lowered position, any movement of vehicle wheels 58 along the track will not cause operation of the system. When the system is desired to be brought to operative position, piston 20 is actuated to raise the frame 24. The means causing actuation of the piston 20 also serves to actuate the piston 164 for raising arms 170, in turn raising the beam 150 with the beam 24. It will thus be seen that the yoke and consequently the brake shoes are moved to wheel engaging position, and engagement of the wheel 58 with the brake member 156 moves the yoke 32 toward the left, causing engagement between the wheel flange 72 and the flange 70, rocking the brake shoe 68 and causing the head 74 to apply brake pressure to the wheel 58. As before, any tipping action of the yoke as caused by the difference in the tread of the wheels is taken care of by the supports 28 and 30.

It will thus be understood that a very efficient and comparatively simple braking system is provided, and it is to be understood that I do not wish to be limited by the exact embodiments of the devices shown, which are merely by way of illustration and not limitation, as various and other forms of the device will of course be apparent to those skilled in the art without departing from the spirit of the invention or the scope of the claims.

I claim:

1. A track brake, comprising a frame adapted to be moved in vertical direction, a yoke supported on said frame, a pair of brake members associated with said yoke and adapted for braking engagement with opposing faces of the car wheels, one of said brake members being mounted for having the wheels of the car running thereon and forcing said yoke in a direction transversely away from the track member, a supporting block for the other one of said brake members formed with a vertical slot, links on which said supporting member is mounted for being movable towards and away from said track, and a roller on said yoke in engagement with said slot.

2. In track brake mechanism, the combination of a track rail for a track vehicle wheel, a support disposed adjacent said rail, means for selectively moving said support, a yoke movably mounted on said support, a brake member movably and resiliently mounted on said yoke on one side of said track rail, a brake member movably mounted on the opposite side of said track rail, cooperating means between said second named brake member and yoke, said second named brake member being movable by said cooperating means into wheel braking position by movement of said yoke through engagement of said first named brake member with a wheel, and supporting means for said second named brake member disposed adjacent said yoke.

3. In track brake mechanism, the combination of a track rail for a track vehicle wheel, a support disposed adjacent said rail, means for selectively moving said support, a yoke movably mounted on said support, a brake member movably and resiliently mounted on said yoke on one side of said track rail, a brake member movably mounted on the opposite side of said track rail, cooperating means between said second named brake member and yoke, said second named brake member being movable by said cooperating means into wheel braking position by movement of said yoke through engagement of said first named brake member with a wheel, and supporting means for said second named brake member disposed adjacent said yoke, said supporting means including a member fixed with respect to said track rail.

4. In a track brake mechanism, the combination of a track rail for a track vehicle wheel, a support disposed adjacent said rail, means for selectively moving said support, a yoke movably mounted on said support, a brake member movably and resiliently mounted on said yoke on one side of said track rail, a brake member movably mounted on the opposite side of said track rail, cooperating means between said second named brake member and yoke, said second named brake member being movable by said cooperating means into wheel braking position by movement of said yoke through engagement of said first named brake member with a wheel, and supporting means for said second named brake member disposed adjacent said yoke, said supporting means including a member fixed with respect to said track rail and extending above said rail for positioning said second named brake member in wheel engaging position.

5. In a track brake mechanism, the combination of a track rail for a track vehicle wheel, a support disposed adjacent said rail, means for selectively moving said support, a yoke movably mounted on said support, a brake member movably and resiliently mounted on said yoke on one side of said track rail, a brake member movably mounted on the opposite side of said track rail, cooperating means between said second named brake member and yoke, said second named brake member being movable by said cooperating means into wheel braking position by movement of said yoke through engagement of said first named brake member with a wheel, and supporting means for said second named brake member disposed adjacent said yoke, said supporting means including a member fixed with respect to said track rail and provided with a movable member engaging said second named brake member and extending above said rail for positioning said second named brake member in wheel engaging position.

6. In a track brake mechanism, the combination of a track rail for a track vehicle wheel, a support disposed adjacent said rail, means for selectively moving said support, a yoke movably mounted on said support, a brake member movably and resiliently mounted on said yoke on one side of said track rail, a brake member movably mounted on the opposite side of said track rail, cooperating means between said second named brake member and yoke, said second named brake member being movable by said cooperating means into wheel braking position by movement of said yoke through engagement of said first named brake member with a wheel, and supporting means for said second named brake member disposed adjacent said yoke, said supporting means including a member fixed with respect to said track rail and provided with a movable member pivoted thereto and to said second named brake member and extending above said rail for positioning said second named brake member in wheel engaging position.

7. In track brake mechanism, the combination of a track rail for a track vehicle wheel, a support disposed adjacent said rail, means for selectively moving said support, a yoke movably mounted on said support, a brake member movably and resiliently mounted on said yoke on one side of said track rail, a brake member movably mounted on the opposite side of said track rail, cooperating means between said second named brake member and yoke, said second named brake member being movable by said cooperating means into wheel braking position by movement of said yoke through engagement of said first named brake member with a wheel, and supporting means for said second named brake member disposed adjacent said yoke, said supporting means including a member movable with respect to said rail for selectively moving said second named brake member into position to engage a wheel.

8. In track brake mechanism, the combination of a track rail for a track vehicle wheel, a support disposed adjacent said rail, means for selectively moving said support, a yoke movably mounted on said support, a brake member movably and resiliently mounted on said yoke on one side of said track rail, a frame member slidably engaging positioning means disposed on said yoke, a brake member carried by said frame member and disposed on the opposite side of the track rail, and means for moving said frame member with respect to said rail and first named support.

9. In track brake mechanism, the combination of a track rail for a track vehicle wheel, a support disposed adjacent said rail, means for selectively moving said support, a yoke movably mounted on said support, a brake member movably mounted on said yoke on one side of said track rail, a brake member movably mounted on the opposite side of said track rail, cooperating means between said second named brake member and yoke, said second named brake member being movable by movement of said cooperating means relative to said brake member into wheel braking position by movement of said yoke through engagement of said first named brake member with a wheel, and supporting means for said second named brake member disposed adjacent said yoke.

10. In track brake mechanism, the combination of a track rail for a track vehicle wheel, a support disposed adjacent said rail, means for selectively moving said support, a yoke movably mounted on said support, a brake member movably mounted on said yoke on one side of said track rail, a brake member movably mounted on the opposite side of said track rail, cooperating means between said second named brake member and yoke, said second named brake member being movable by said cooperating means into wheel braking position by movement of said yoke through engagement of said first named brake member with a wheel, and supporting means for said second named brake member disposed adjacent said yoke, said supporting means including a member fixed with respect to said track rail.

11. In track brake mechanism, the combination of a track rail for a track vehicle wheel, a support disposed adjacent said rail, means for selectively moving said support, a yoke movably mounted on said support, a brake member movably mounted on said yoke on one side of said track rail, a brake member movably mounted on the opposite side of said track rail, cooperating means between said second named brake member and yoke, said second named brake member being movable by said cooperating means into wheel braking position by movement of said yoke through engagement of said first named brake member with a wheel, and supporting means for said second named brake member disposed adjacent said yoke, said supporting means including a member fixed with respect to said track rail and extending above said rail for positioning said second named brake member in wheel engaging position.

12. In track brake mechanism, the combination of a track rail for a track vehicle wheel, a support disposed adjacent said rail, means for selectively moving said support, a yoke movably mounted on said support, a brake member movably mounted on said yoke on one side of said track rail, a brake member movably mounted on the opposite side of said track rail, cooperating means between said second named brake member and yoke, said second named brake member being movable by said cooperating means into wheel braking position by movement of said yoke through engagement of said first named brake member with a wheel, and supporting means for said second named brake member disposed adjacent said yoke, said supporting means including a member fixed with respect to said track rail and provided with a movable member engaging said second named brake member and extending above said rail for positioning said second named brake member in wheel engaging position.

13. In track brake mechanism, the combination of a track rail for a track vehicle wheel, a support disposed adjacent said rail, means for selectively moving said support, a yoke movably mounted on said support, a brake member movably mounted on said yoke on one side of said track rail, a brake member movably mounted on the opposite side of said track rail, cooperating means between said second named brake member and yoke, said second named brake member being movable by said cooperating means into wheel braking position by movement of said yoke through engagement of said first named brake member with a wheel, and supporting means for said second named brake member disposed adjacent said yoke, said supporting means including a member fixed with respect to said track rail and provided with a movable member pivoted thereto and to said second named brake member and extending above said rail for positioning said second named brake member in wheel engaging position.

14. In track brake mechanism, the combination of a track rail for a track vehicle wheel, a support disposed adjacent said rail, means for selectively moving said support, a yoke movably mounted on said support, a brake member movably mounted on said yoke on one side of said track rail, a brake member movably mounted on the opposite side of said track rail, cooperating means between said second named brake member and yoke, said second named brake member being movable by said cooperating means into wheel braking position by movement of said yoke through engagement of said first named brake member with a wheel, and supporting means for said second named brake member disposed adjacent said yoke, said supporting means including a member movable with respect to said rail for selectively moving said second named brake member into position to engage a wheel.

15. In track brake mechanism, the combination of a track rail for a track vehicle wheel, a support disposed adjacent said rail, means for selectively moving said support, a yoke movably mounted on said support, a brake member movably mounted on said yoke on one side of said track rail, a frame member slidably engaging positioning means disposed on said yoke, a brake member carried by said frame member and disposed on the opposite side of the track rail, and means for moving said frame member with respect to said rail and first named support.

In testimony whereof I hereunto affix my signature.

KARL ERNST WENZEL.